US011603941B2

(12) United States Patent
Fujiwara et al.

(10) Patent No.: US 11,603,941 B2
(45) Date of Patent: Mar. 14, 2023

(54) RELIEF VALVE

(71) Applicant: KAWASAKI JUKOGYO KABUSHIKI KAISHA, Kobe (JP)

(72) Inventors: Hiroaki Fujiwara, Kobe (JP); Masahiro Matsuo, Kobe (JP)

(73) Assignee: KAWASAKI JUKOGYO KABUSHIKI KAISHA, Kobe (JP)

(*) Notice: Subject to any disclaimer, the term of this patent is extended or adjusted under 35 U.S.C. 154(b) by 36 days.

(21) Appl. No.: 17/593,332

(22) PCT Filed: Apr. 7, 2020

(86) PCT No.: PCT/JP2020/015736
§ 371 (c)(1),
(2) Date: Sep. 15, 2021

(87) PCT Pub. No.: WO2020/217981
PCT Pub. Date: Oct. 29, 2020

(65) Prior Publication Data
US 2022/0178456 A1    Jun. 9, 2022

(30) Foreign Application Priority Data

Apr. 20, 2019  (JP) .............................. JP2019-080573

(51) Int. Cl.
  *F16K 17/10*    (2006.01)
  *F16K 27/02*    (2006.01)
  (Continued)

(52) U.S. Cl.
  CPC ............ *F16K 17/105* (2013.01); *F16K 27/02* (2013.01); *F16K 31/1221* (2013.01); *F16K 47/023* (2013.01); *F16K 17/06* (2013.01)

(58) Field of Classification Search
  CPC .... F16K 17/105; F16K 27/02; F16K 31/1221; F16K 47/023; F16K 17/06; F15B 13/024; F15B 2211/522
  See application file for complete search history.

(56) References Cited

U.S. PATENT DOCUMENTS 2,268,227 A * 12/1941 Rose ..................... F16K 17/065
                                              137/538
3,215,236 A * 11/1965 Pensa ...................... F16D 25/12
                                              137/489.5
(Continued)

FOREIGN PATENT DOCUMENTS

JP        2908435 B1     4/1999
JP        2908435 B1 *   6/1999
(Continued)

OTHER PUBLICATIONS

JP H11337458 A Translation, 1999 (Year: 1999).*
JP2908435B1 Translation, 1999 (Year: 1999).*

*Primary Examiner* — Daphne M Barry
(74) *Attorney, Agent, or Firm* — Alleman Hall Creasman & Tuttle LLP

(57) ABSTRACT

A relief valve includes: a housing; a plunger movable to each of a closed position and an open position; a differential pressure chamber; a spring member; a piston; and a damping chamber. The plunger includes a first damping passage penetrating the plunger and bringing an area outside the plunger and a through passage into communication. The piston includes a second damping passage penetrating the piston and bringing an area inside the piston and the damping chamber into communication. A communication space connected to each of the first damping passage and the second damping passage is formed between the plunger and the piston.

5 Claims, 6 Drawing Sheets

(51) Int. Cl.
*F16K 31/122* (2006.01)
*F16K 47/02* (2006.01)
*F16K 17/06* (2006.01)

(56) References Cited

U.S. PATENT DOCUMENTS

| | | | | |
|---|---|---|---|---|
| 5,050,636 A | * | 9/1991 | Sagawa | F16K 17/0433 137/494 |
| 6,142,176 A | | 11/2000 | Sagawa et al. | |
| 2014/0069529 A1 | * | 3/2014 | Matsuo | F16K 17/065 137/505.11 |

FOREIGN PATENT DOCUMENTS

| | | | |
|---|---|---|---|
| JP | H11337458 A | * | 12/1999 |
| KR | 20200076425 A | | 6/2020 |

\* cited by examiner

RELIEF VALUE

TECHNICAL FIELD

The present invention relates to relief valves having a pressure-relief function.

BACKGROUND ART

A turning body provided on construction equipment or the like is driven by a hydraulic motor to turn, and a relief valve is used to slow down or stop the turn; at the time of braking, there are cases where a surge pressure that may cause a shock is generated. The relief valve disclosed in Patent Literature (PTL) 1, for example, is known to prevent such surge pressure generation. The relief valve disclosed in PTL 1 has a pressure-relief function and operates as follows. Specifically, in the relief valve disclosed in PTL 1, a plunger starts moving by a starting pressure lower than a relief pressure, and thus a valve passage is opened. After the valve passage is opened, a piston then moves down, and thus a spring is compressed. As a result, the spring load acting on the plunger increases, and the pressure increases and reaches the relief pressure. Furthermore, in the relief valve disclosed in PTL 1, a damping chamber is provided, and the piston moves down while discharging operating oil in the damping chamber. Therefore, in the relief valve disclosed in PTL 1, by adjusting the flow rate of the operating oil to be discharged, it is possible to prevent the piston from instantly moving through its full stroke, and the hydraulic pressure can be gradually increased up to the relief pressure.

CITATION LIST

Patent Literature

PTL 1: Japanese Patent No. 2908435

SUMMARY OF INVENTION

Technical Problem

In the relief valve disclosed in PTL 1, the piston has a communication hole connecting the damping chamber and the inner hole of the piston, and the operating oil in the damping chamber is discharged through the communication hole. Meanwhile, a rear end portion of the plunger is inserted through the inner hole of the piston, and the plunger reciprocates within the piston by lifting of the plunger or downward movement of the piston. Therefore, in order to ensure that the communication hole is not covered by the plunger that reciprocates, the communication hole needs to be positioned behind the maximum lift position of the plunger. This means that the piston is formed elongated backward, resulting in an increase in the size of the relief valve.

Thus, an object of the present invention is to provide a relief valve that can be downsized.

Solution to Problem

A relief valve according to the present invention includes: a housing including a valve passage having an inlet port through which an operating oil flows in and an outlet port through which the operating oil flows out; a plunger housed in the housing in a manner to be movable to each of a closed position and an open position and pressed toward the open position by the operating oil in the inlet port, the closed position being a position in which a valve portion formed at one end of the plunger is seated on a valve seat of the housing to close the valve passage, the open position being a position in which the valve portion is off the valve seat to open the valve passage; a differential pressure chamber into which the operating oil in the inlet port is guided via a through passage formed in the plunger and which presses the other end of the plunger toward the closed position by the operating oil guided; a spring member that biases the plunger toward the closed position; a piston exteriorly provided in a manner to be movable along the plunger and configured to compress the spring member by moving according to a pressure of the operating oil that is guided to the differential pressure chamber; and a damping chamber formed around an outer peripheral surface of the piston and configured to store the operating oil to restrict movement of the piston in a compression direction. The plunger includes a first damping passage penetrating the plunger and bringing an area outside the plunger and the through passage into communication. The piston includes a second damping passage penetrating the piston and bringing an area inside the piston and the damping chamber into communication. A communication space connected to each of the first damping passage and the second damping passage is formed between the plunger and the piston.

According to the present invention, with the communication space, it is possible to position the damping chamber on the side of the plunger in an overlapping manner. This allows a reduction in the length of the relief valve, making it possible to downsize the relief valve.

In the above-described invention, it is preferable that at least one of the first damping passage and the second damping passage include a throttle that restricts a flow from the damping chamber to the through passage.

According to this configuration, it is possible to reduce a discharge speed at which the operating oil is discharged from the damping chamber, and the pressure-relief time can be increased.

In the above-described invention, it is preferable that each of the first damping passage and the second damping passage include the throttle.

According to this configuration, by forming two throttles, it is possible to reduce the discharge speed at which the operating oil is discharged from the damping chamber, even without reducing the area of permeation of each of the throttles. This allows a reduction in the occurrence of contaminants or the like flowing into and clogging the first damping passage and the second damping passage.

In the above-described invention, it is preferable that the piston be movable from a non-compression position to a maximum compression position to compress the spring member, and the communication space be in communication with the first damping passage and the second damping passage regardless of where the piston is located between the non-compression position and the maximum compression position.

According to this configuration, both the first damping passage and the second damping passage can always be in communication with the communication space regardless of where the piston is located between the non-compression position and the maximum compression position. Therefore, there is no need to form a passage other than the damping passage to discharge the operating oil in the damping chamber, and the increase in the complexity of the relief valve can be minimized.

In the above-described invention, it is preferable that the plunger include a spring bearing portion, a plunger throttle formed in the through passage, and a first pressure-receiving surface that receives a hydraulic pressure of the operating oil in the inlet port, the spring member be a compression coil spring and be exteriorly provided on the plunger in a state of being compressed between the spring bearing portion of the plunger and the piston, the piston include a second pressure-receiving surface that receives a hydraulic pressure of the operating oil in the differential pressure chamber and, when the second pressure-receiving surface receives a pressure, move in the compression direction toward the spring bearing portion of the plunger to compress the compression coil spring, and the area of the first pressure-receiving surface be smaller than the area of the second pressure-receiving surface.

According to this configuration, the increase in the differential pressure can be minimized using the plunger throttle, and thus it is possible to move the plunger and open the valve passage first. Thereafter, as the differential pressure increases, the spring member can be compressed to increase the biasing force.

Advantageous Effects of Invention

According to the present invention, downsizing is possible.

The above object, other objects, features, and advantages of the present invention will be made clear by the following detailed explanation of preferred embodiments with reference to the attached drawings.

DESCRIPTION OF EMBODIMENTS

Hereinafter, a relief valve 1 according to an embodiment of the present invention will be described with reference to the aforementioned drawings. Note that the concept of directions mentioned in the following description is used for the sake of explanation and is not intended to limit the orientations, etc., of elements according to the present invention to these directions. The relief valve 1 described below is merely one embodiment of the present invention. Thus, the present invention is not limited to the embodiment and may be subject to addition, deletion, and alteration within the scope of the essence of the present invention.

Figure 1:
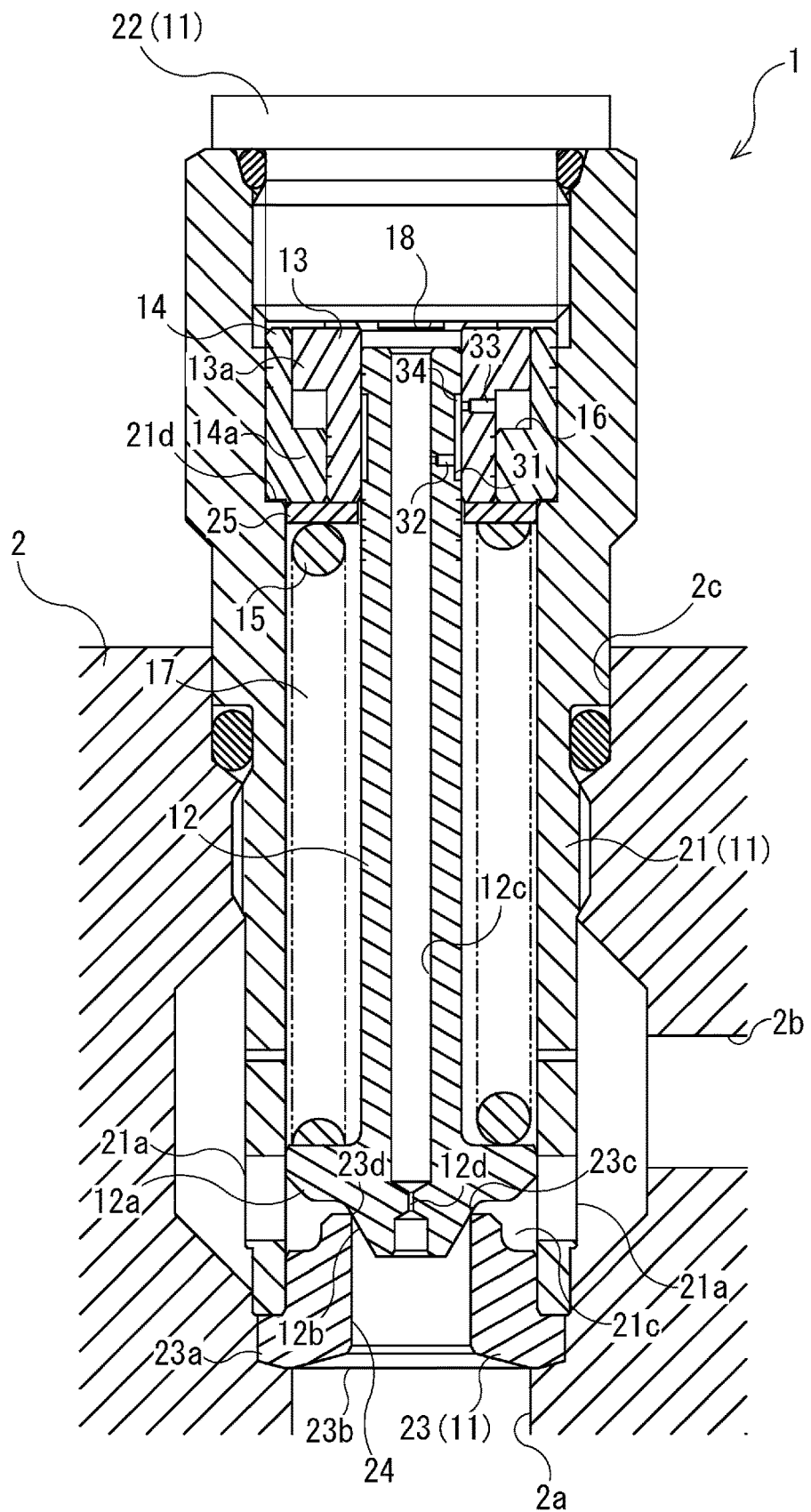
FIG. 1 is a cross-sectional view of a relief valve according to an embodiment of the present invention.

Construction equipment or the like includes a relief valve 1 such as that illustrated in FIG. 1, in order to slow down or stop rotation of a hydraulic motor that drives a turning body or the like. When the hydraulic pressure in an oil passage not illustrated in the drawings reaches a predetermined relief pressure, the relief valve 1 discharges a portion of the oil to a tank or the like to maintain the oil passage at no more than the relief pressure. The relief valve 1 having such a function is attached to a valve block 2, for example. The valve block 2 includes an inlet passage 2a, an outlet passage 2b, and an insertion hole 2c, and each of the inlet passage 2a and the outlet passage 2b is connected to the oil passage and the tank (not illustrated in the drawings). Furthermore, each of the inlet passage 2a and the outlet passage 2b is connected to the insertion hole 2c, and the relief valve 1 is inserted and screwed into the insertion hole 2c.

The relief valve 1 mainly includes a housing 11, a plunger 12, a piston 13, a sleeve 14, and a spring member 15, and the housing 11 is formed in the approximate shape of a circular cylinder having a closed end. More specifically, housing 11 includes a casing 21, a lid body 22, and a seat member 23. The casing 21 is formed in the approximate shape of a circular cylinder with an opening at a base end covered by the lid body 22. Furthermore, the casing 21 has a leading end portion inserted into the valve block 2 and thus is threaded into the valve block 2, and the seat member 23 is inserted through the leading end of the casing 21.

The seat member 23 is formed in the approximate shape of a circular ring with a leading end portion inserted in an opening end of the casing 21. A base end portion of the seat member 23 is formed larger in diameter than the leading end portion. Specifically, the seat member 23 includes a flange 23a at the leading end and is fixed to the leading end of the casing 21 by the flange 23a being sandwiched between the casing 21 and the valve block 2. A base-end opening, namely, an inlet port 23b, of the seat member 23 disposed in this manner faces the inlet passage 2a, and the operating oil flowing in the oil passage is guided to the inner hole of the seat member 23 via the inlet passage 2a. A valve seat 23d is formed around a leading-end opening, namely, a valve port 23c, of the seat member 23, and the valve port 23c is closed when the plunger 12 is seated on the valve seat 23d.

The plunger 12 is formed in the approximate shape of a circular ring and includes a guide portion 12a on an outer peripheral surface at the leading end. The guide portion 12a protrudes radially outward from a remaining portion of the plunger 12, and the outer peripheral surface of the guide portion 12a is in abutment with the inner peripheral surface of the casing 21. Furthermore, the plunger 12 includes, on the leading end side of the guide portion 12a, a valve portion 12b which is approximately tapered in shape and is seated on the valve seat 23d to close the valve port 23c. The plunger 12 having such a shape is slidably guided by the inner peripheral surface of the casing 21 along the axis thereof and can move between a closed position in which the valve portion 12b is seated on the valve seat 23d and an open position in which the valve portion 12b is off the valve seat 23d. Therefore, the relief valve 1 can open the valve port 23c by moving the plunger 12 to the open position.

Furthermore, the plunger 12 forms an annular passage 21c between the guide portion 12a of the plunger 12 and the leading end of the seat member 23. Moreover, the casing 21 has a plurality of outlet ports 21a in positions corresponding to the annular passage 21c, and the annular passage 21c and the outlet passage 2b are in communication through the outlet ports 21a. Specifically, the annular passage 21c is connected to the outlet passage 2b through the plurality of outlet ports 21a and further connected to the inlet passage 2a through the valve port 23c and the inlet port 23b, and thus forms a valve passage 24 together with the plurality of outlet ports 21a, the inlet port 23b, and the valve port 23c. The valve passage 24 formed as just described is closed when the plunger 12 moves to the closed position, and is opened when the plunger 12 moves to the open position. In the open state, the inlet passage 2a and the outlet passage 2b are in communication with each other, allowing the operating oil flowing in the oil passage to be discharged to the tank. The piston 13 is exteriorly provided at a base end portion of the plunger 12 which performs such opening/closing operation.

Figure 2:
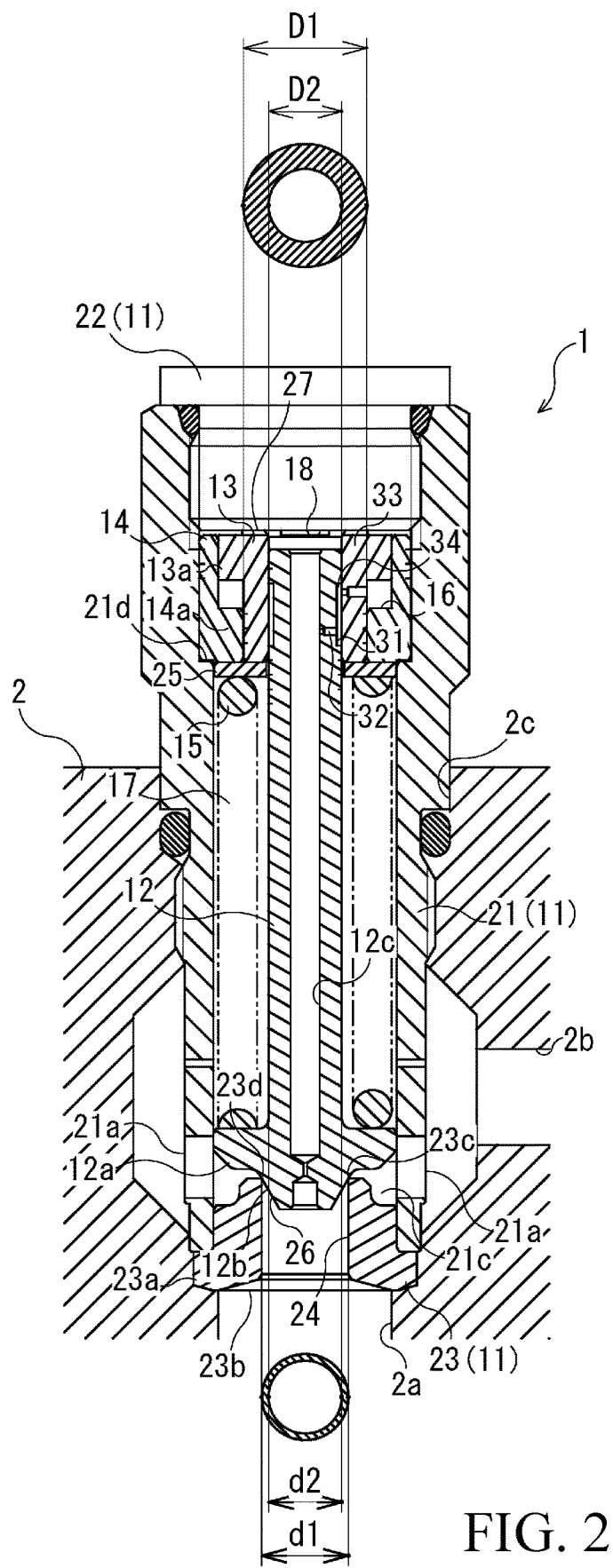
FIG. 2 is a cross-sectional view showing a pressure-receiving area in each of a plunger and a piston of the relief valve illustrated in FIG. 1.

The piston 13 is formed in the approximate shape of a circular cylinder with an inner diameter D2 (refer to FIG. 2) substantially equal to the outer diameter of the base end portion of the plunger 12. In other words, the piston 13 is exteriorly provided at the base end portion of the plunger 12 in such a manner as to be slidable thereon. The piston 13 includes, at the base end, an outward flange 13a which is formed larger in diameter than a remaining portion, and an outer diameter D1 (refer to FIG. 2) of the outward flange 13a is formed smaller in diameter than the inner diameter of the casing 21. In other words, the outward flange 13a is spaced apart from the inner peripheral surface of the casing 21, and the sleeve 14 is located between the outward flange 13a and the inner peripheral surface of the casing 21.

The sleeve 14 is formed in the approximate shape of a circular cylinder and is inserted and fixed to the base end portion of the casing 21. More specifically, a step portion 21d is formed on the inner peripheral surface of casing 21, and the sleeve 14 is positioned between the step portion 21d and the lid body 22 and housed in the casing 21. The sleeve 14 disposed as just described includes an inward flange 14a on the inner peripheral surface on the leading end side. The inner diameter of the inward flange 14a is substantially equal to the outer diameter D1 of the leading end portion of the piston 13. In other words, the inner flange 14a is in abutment with the outer peripheral surface of the piston 13, and the piston 13 is slidably guided by the sleeve 14 using the leading end portion and the outward flange 13a of the piston 13. Furthermore, an opening end of the sleeve 14 that is located at the leading end is positioned opposite to and spaced from the guide portion 12a of the plunger 12. Therefore, a spring housing space 17 in the appropriate shape of a circular ring is formed between these elements, and the spring member 15 is housed in the spring housing space 17.

The spring member 15 is a compression coil spring, for example, and is exteriorly provided at a middle portion of the plunger 12. The spring member 15 has one end in abutment with the guide portion 12a of the plunger 12 and the other end in abutment with the opening end of the sleeve 14 via a spring bearing member 25. The spring member 15 disposed as just described biases the plunger 12 in one axial direction, that is, toward the closed position. Furthermore, the spring bearing member 25 is configured as follows. Specifically, the spring bearing member 25 is, for example, a spring bearing washer, and formed in the approximate shape of a circular ring, and is exteriorly provided on the plunger 12 in such a manner as to be movable in the axial direction. The inner diameter of the spring bearing member 25 is smaller than the inner diameter of the sleeve 14, and the spring bearing member 25 extends radially inward relative to the inward flange 14a. Therefore, the spring bearing member 25 is in abutment with the leading end portion of the piston 13 in addition to the opening end of the sleeve 14.

The piston 13 is disposed with the outward flange 13a spaced apart from the inward flange 14a of the sleeve 14 and is configured to be slidable in the axial direction relative to the sleeve 14. More specifically, a damping chamber 16 is formed between the outward flange 13a and the inward flange 14a, and the piston 13 can move in one axial direction a distance corresponding to the damping chamber 16. Furthermore, by moving the piston 13 in one axial direction (namely, a compression direction), it is possible to cause the leading end of the piston 13 to protrude from the sleeve 14 to the spring housing space 17. Specifically, the piston 13 can move from a non-compression position in which the leading end of the piston 13 does not protrude from the sleeve 14 (in other words, the position of the piston 13 not compressing the spring member 15) to a maximum compression position which the piston 13 reaches after moving the distance corresponding to the damping chamber 16 (in other words, the position of the piston 13 fully stroked). Thus, the spring member 15 can be further compressed, and the biasing force of the spring member 15 can be further increased. The piston 13 having such functions has a based end facing the lid body 22 and forms a differential pressure chamber 18 between the piston 13 and the lid body 22. The plunger 12 also has a base end facing the differential pressure chamber 18, and a through passage 12c is formed in the plunger 12 in order to guide the operating oil to the differential pressure chamber 18.

The through passage 12c is an inner hole of the plunger 12 and is formed penetrating the plunger 12 in the axial direction. The through passage 12c formed as just described connects the differential pressure chamber 18 and the inlet passage 2a through the through passage 12c, and the operating oil is guided to the differential pressure chamber 18 through the through passage 12c. The pressure of the operating oil guided to the differential pressure chamber 18, that is, the differential pressure, acts on the base end of the piston 13, and a load corresponding to the differential pressure compresses the spring member 15. Furthermore, the differential pressure also acts on the base end of the plunger 12 which is slidably inserted into the piston 13, and the plunger 12 is also pressed toward the closed position by the differential pressure. Note that a throttle 12d is formed in the through passage 12c; with this, abrupt increases in the pressure in the differential pressure chamber 18 are minimized.

Figure 3:
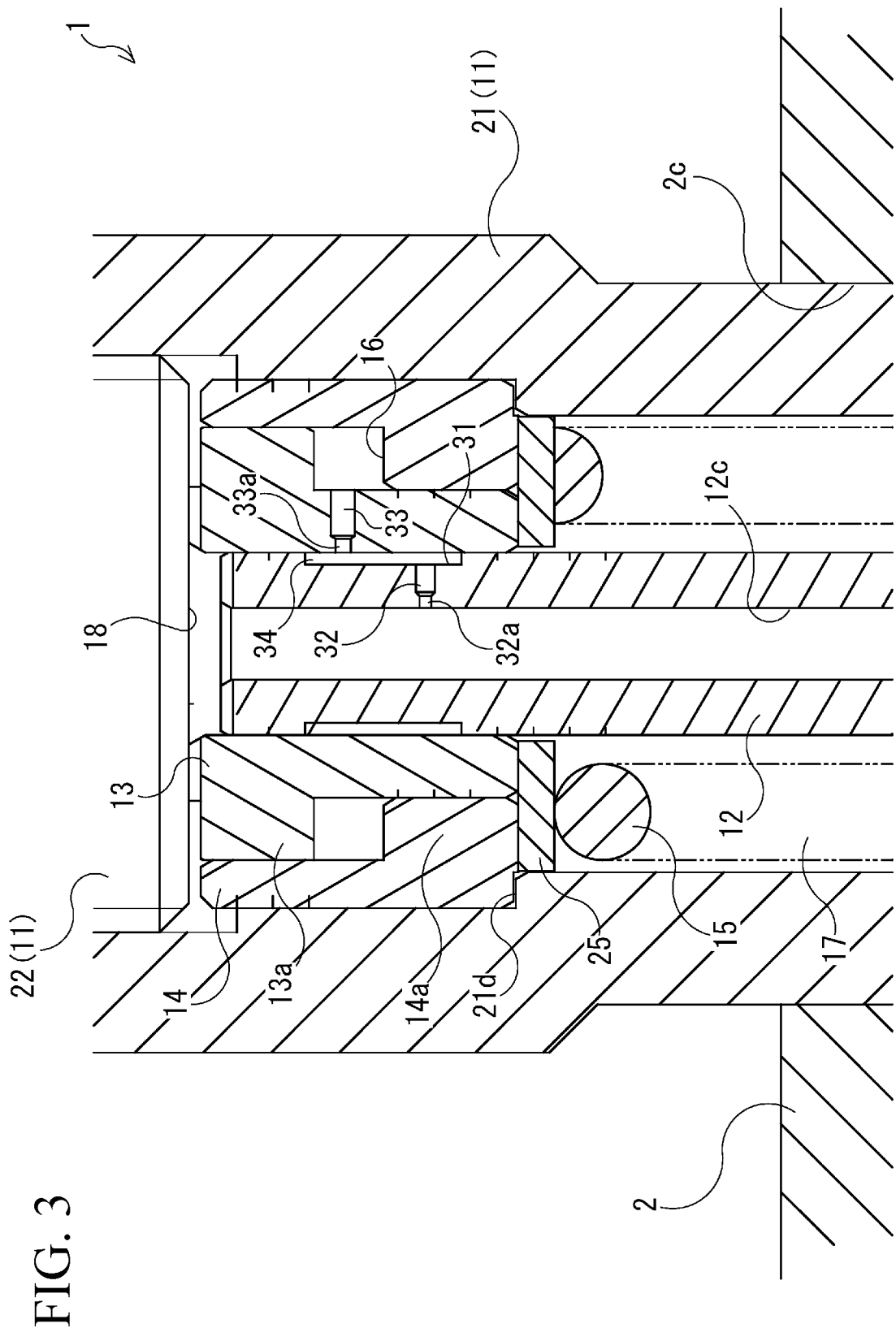
FIG. 3 is an enlarged cross-sectional view illustrating an enlarged view of a portion of the relief valve illustrated in FIG. 1.

The relief valve 1 configured as described above is further configured as follows. Specifically, an outer peripheral groove 31 is formed in the outer peripheral surface of the base end portion of the plunger 12, as illustrated in FIG. 3. The outer peripheral groove 31 is formed along the entire perimeter in the circumferential direction, in a position spaced from the base end of the plunger 12 toward the leading end thereof. Therefore, a communication space 34 in the approximate shape of a circular ring which is isolated from the differential pressure chamber 18 is formed between the plunger 12 and the piston 13. Furthermore, at the base end portion of the plunger 12, a first damping passage 32 is formed so as to connect the communication space 34 and the through passage 12c; the first damping passage 32 allows the operating oil to move back and forth between the communication space 34 and the through passage 12c.

Furthermore, a second damping passage 33 is formed in the piston 13; the second damping passage 33 is formed so as to radially penetrate the piston 13. The second damping passage 33 is formed corresponding to the damping chamber 16 and the communication space 34 and has one end facing the damping chamber 16 and the other end facing the communication space 34. The second damping passage 33 formed as just described brings the damping chamber 16 and the outer peripheral groove 31 into communication regardless of where the piston 13 is located between the non-compression position or the maximum compression position, and can guide the operating oil to the damping chamber 16 and store the operating oil therein. The operating oil stored in the damping chamber 16 can be discharged through the two damping passages 32, 33 (refer to the arrow in FIG. 5) when the piston 13 moves in one axial direction, and it is possible to slow down the movement of the piston 13 by discharging the operating oil during the movement of the piston 13.

In the relief valve 1 configured as described above, the operating oil in the inlet passage 2a is guided to the differential pressure chamber 18 via the through passage 12c, and the hydraulic pressure in the differential pressure chamber 18 is substantially equal to the hydraulic pressure in the inlet passage 2a. Therefore, the plunger 12 receives the same hydraulic pressure at both the base end portion and the leading end portion (namely, a first pressure-receiving surface 26). Meanwhile, the relief valve 1 is formed so that a bore diameter (that is, the outer diameter of the pressure-receiving surface at the leading end portion) d1 of the valve port 23c is smaller than an outer diameter d2 of the base end of the plunger 12 (refer to FIG. 2). Therefore, a load corresponding to a pressure-receiving area A1 which is determined by subtracting the area of the valve port 23c from the area of the base end of the plunger 12 acts on the plunger 12 against the biasing force of the spring member 15, that is, in the other axial direction, and when said load exceeds the biasing force of the spring member 15, the valve port 23c is opened.

The piston 13 also receives a differential pressure at the base end portion (namely, a second pressure-receiving surface 27) and receives a hydraulic pressure from the damping chamber 16 at the outer flange 13a. Since the operating oil is guided also to the damping chamber 16 via the through passage 12c and the two damping passages 32, 33, the hydraulic pressure in the damping chamber 16 is substantially equal to the differential pressure, and the piston 13 receives, at the base end and the outward flange 13a thereof, the same hydraulic pressures that oppose each other. Therefore, a load corresponding to a pressure-receiving area A2 which is determined by subtracting the area of the outward flange 13a (in other words, the area of a portion protruding from the remaining portion) from the area of the base end of the piston 13 (in other words, the pressure-receiving area A2 which is determined by subtracting the area within the inner diameter D2 from the area within the outer diameter D1 of the remaining portion) acts on the piston 13 in one axial direction, and the spring member 15 is further compressed with said load to increase the biasing force (refer to FIG. 2). Furthermore, the pressure-receiving area A1 is set smaller than the pressure-receiving area A2, and setting the pressure-receiving area A1 small makes it possible to cause the leading end portion of the piston 13 to protrude from the sleeve 14 and further compress the spring member 15.

Operation of Relief Valve

Figure 4:
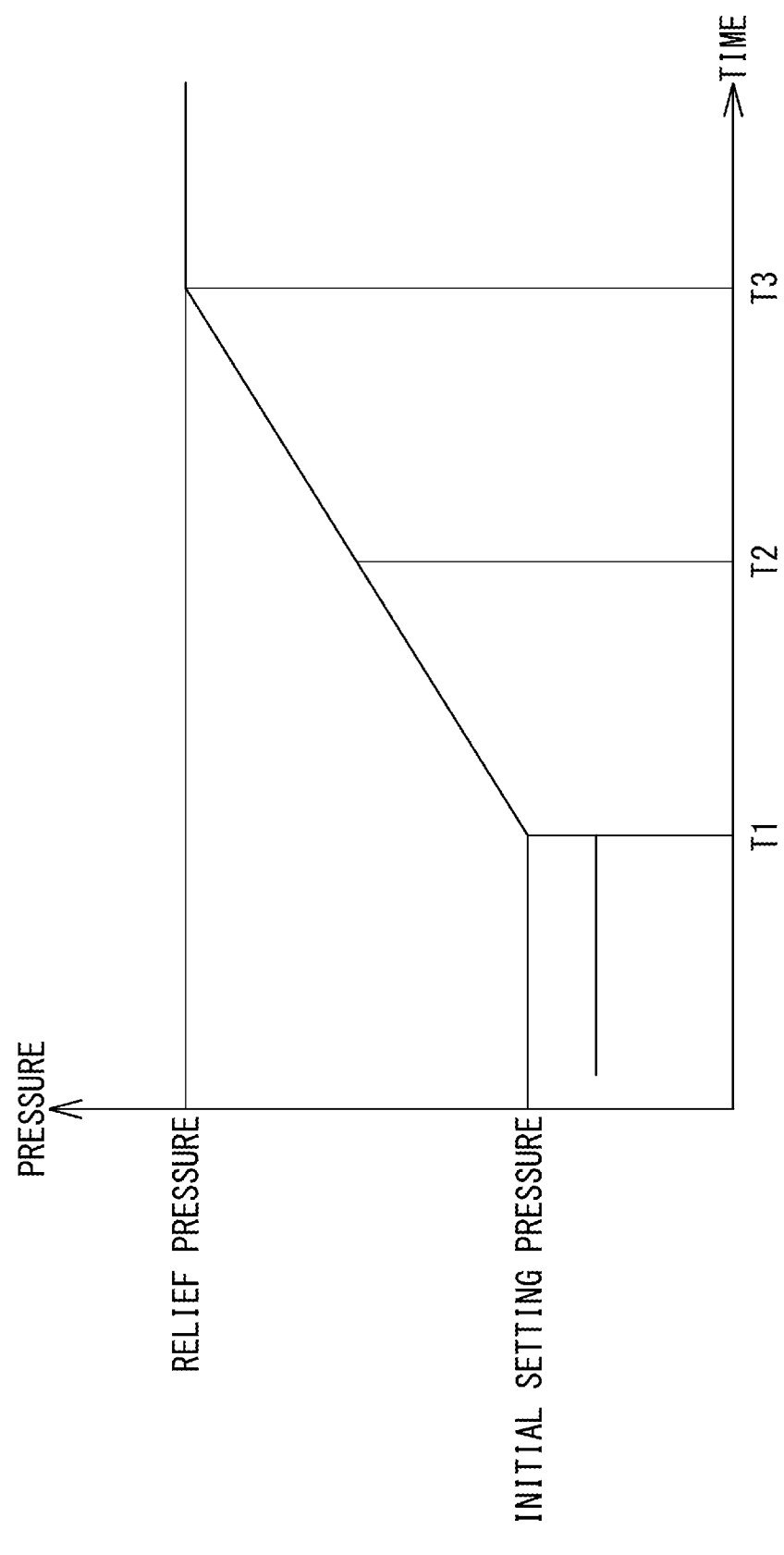
FIG. 4 is a graph showing temporal changes in a relief pressure at the relief valve illustrated in FIG. 1.

In the relief valve 1 configured as described above, since the throttle 12d is formed in the through passage 12c, there is a difference in pressure increases between the inlet passage 2a and the differential pressure chamber 18. Therefore, it is possible to move the plunger 12 before the piston 13 starts moving, and when the hydraulic pressure in the oil passage, that is, the pressure in the inlet port 23b, increases and exceeds a predetermined starting pressure (refer to time t1 in FIG. 4), the plunger 12 operates as follows. In other words, the load on the plunger 12 that originates from the operating oil becomes greater than the biasing force of the spring member 15, and the plunger 12 moves to the open position. Thus, the valve port 23c is opened, and the operating oil in the inlet passage 2a passes through the valve port 23c and then is discharged to the tank via the outlet passage 2b. In other words, the operating oil flowing in the oil passage is discharged to the tank through the valve passage 24 of the relief valve 1.

Figure 5:
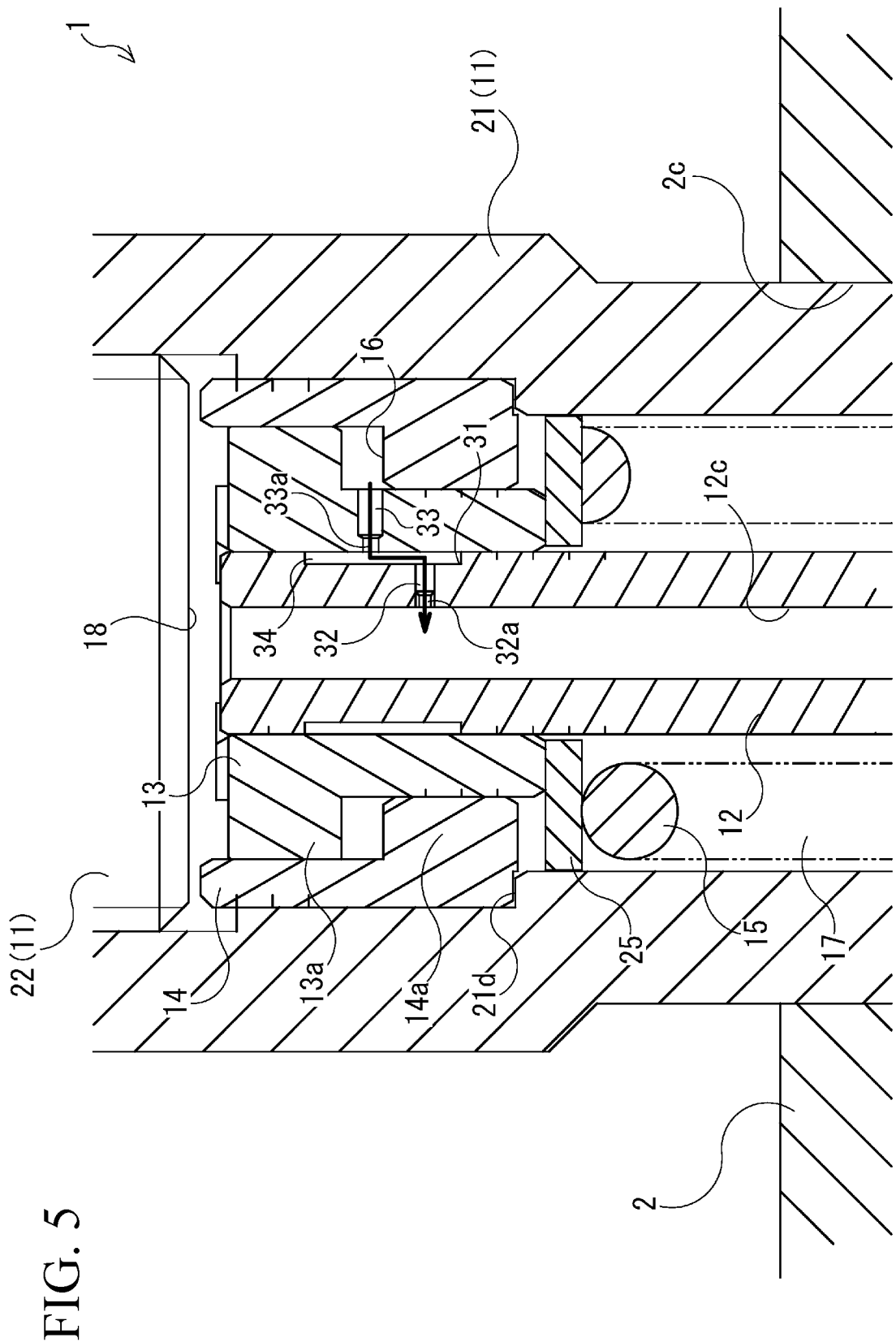
FIG. 5 is an enlarged cross-sectional view of the relief valve illustrated in FIG. 3 with the piston compressing a spring member.
Figure 6:
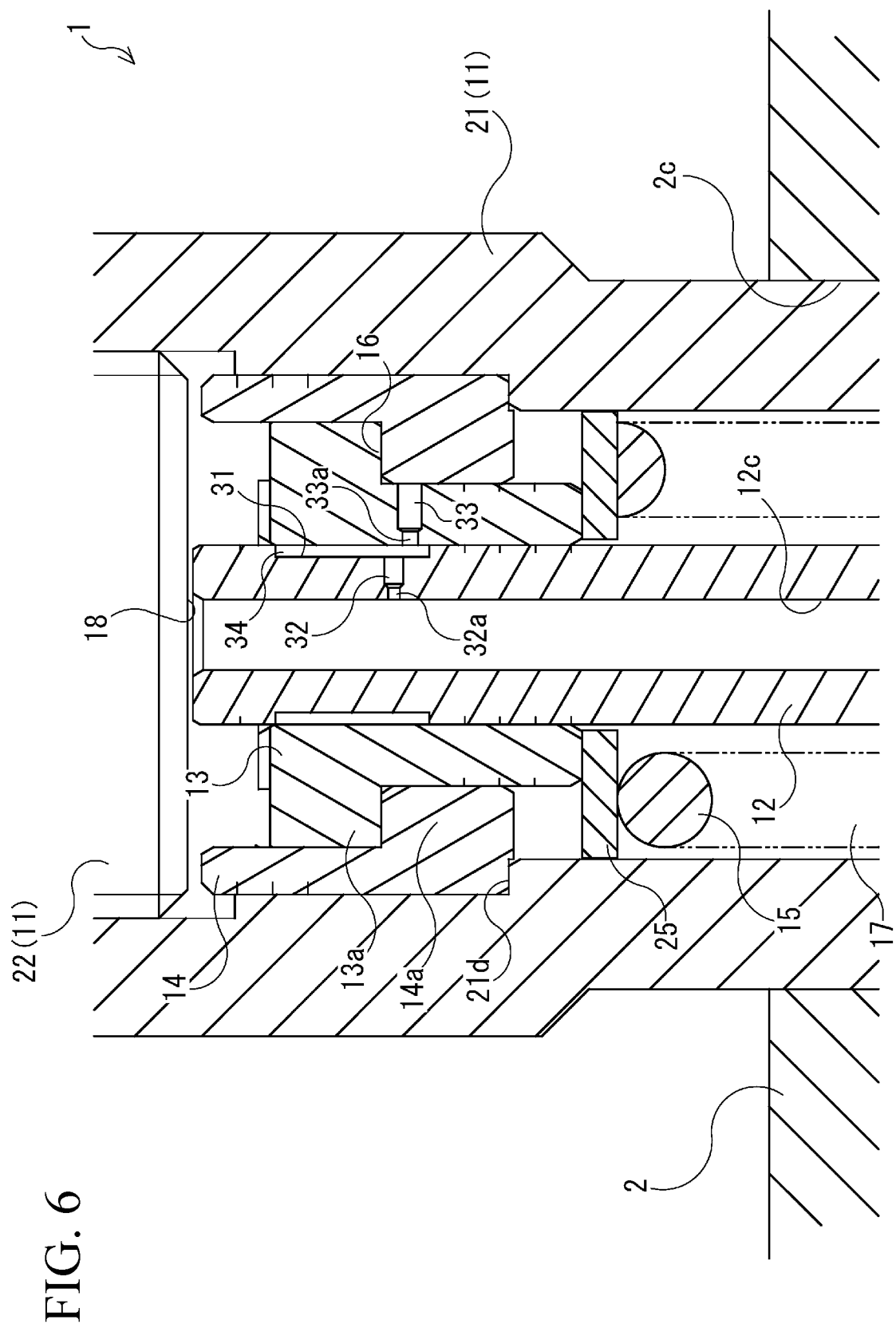
FIG. 6 is an enlarged cross-sectional view of the relief valve illustrated in FIG. 3 with the piston moved to a maximum compression position.

Subsequently, when the pressure in the differential pressure chamber 18 increases, the piston 13 eventually moves in one axial direction and compresses the spring member 15 (refer to FIG. 5). Accordingly, the biasing force that presses the plunger 12 toward the closed position increases, and a primary pressure required to open the valve port 23c, that is, an operating pressure, increases (refer to time t1 to t2 in FIG. 4). As a result of movement of the piston 13 toward the maximum compression position, the operating pressure continues to increase and when the piston 13 reaches the maximum compression position (refer to FIG. 6), the operating pressure reaches the relief pressure (refer to time t3 in FIG. 4). Thus, it is possible to discharge the operating oil to the oil passage and maintain the pressure in the oil passage at the relief pressure or less (refer to time t3 onward in FIG. 4).

Meanwhile, the relief valve 1 has a pressure-relief function to prevent a surge pressure when the operating pressure reaches the relief pressure. Specifically, in the relief valve 1, after the hydraulic pressure in the inlet port 23b exceeds the starting pressure and the valve passage 24 is opened, the operating pressure slowly increases up to the relief pressure over time. As just described, in the relief valve 1, pressure-relief time is provided which is time required for the operating pressure that starts increasing from the starting pressure to reach the relief valve, and the pressure-relief time is secured by limiting the speed of travel of the piston 13. In other words, in the relief valve 1, the speed of travel of the piston 13 corresponds to a discharge speed at which the operating oil in the damping chamber 16 is discharged, and the discharge speed is limited by the two damping passages 32, 33. Accordingly, the speed of travel of the piston 13 is reduced, and it is possible to slowly increase the operating pressure. This minimizes abrupt increases in the operating pressure, making it possible to reduce surges in pressure when the operating pressure reaches the relief pressure (refer to time t3 in FIG. 4).

In the relief valve 1 having such a pressure-relief function, it is possible to adjust the pressure-relief time by adjusting the discharge speed at which the operating oil is discharged through the damping passages 32, 33. In the present embodiment, the two damping passages 32, 33 include throttles 32a, 33a, respectively, in order to adjust the discharge speed. Therefore, it is possible to reduce the discharge speed at which the operating oil is discharged from the damping chamber 16, and the pressure-relief time can be increased. Furthermore, by forming the two throttles 32a, 33a, it is possible to reduce the discharge speed at which the operating oil is discharged from the damping chamber 16, even without reducing the area of permeation of each of the throttles 32a, 33a, unlike a conventional relief valve. This allows a reduction in the occurrence of contaminants or the like flowing into and clogging the two damping passages 32, 33. Note that the relief valve 1 includes the two throttles 32a, 33a, but does not necessarily need to include two throttles and may include only one or none of the two throttles 32a, 33a.

In the relief valve 1 configured as described above, with the communication space 34, it is possible to position the damping chamber 16 on the side, that is, radially outward, of the plunger 12 in an overlapping manner. This allows a reduction in the axial length of the relief valve 1, making it possible to downsize the relief valve 1. Furthermore, since the two damping passages 32, 33 are always in communication with the communication space 34 regardless of where the piston 13 is located between the non-compression position or the maximum compression position, there is no need to form another passage to discharge the operating oil in the damping chamber 16. Therefore, the increase in the complexity of the structure of the relief valve 1 can be minimized.

Other Embodiments

The relief valve 1 according to the present embodiment is used to apply the brake on the hydraulic motor that mainly drives a turning body of construction equipment, but is not necessarily limited to this usage. Specifically, the relief valve 1 may be used to apply the brake on a hydraulic motor that drives another device or may be used to apply the brake on another actuator. Furthermore, the relief valve 1 may be provided not only on a device for applying the brake on an actuator, but also on a hydraulic circuit in order to simply limit the pressure in the oil passage to the relief pressure or less.

Furthermore, in the relief valve 1 according to the present embodiment, the outer peripheral groove 31 is formed in the plunger 12, but does not necessarily need to be formed therein. Specifically, the outer peripheral groove 31 may be formed in the inner peripheral surface of the piston 13; it is sufficient that the communication space 34 be formed between the plunger 12 and the piston 13.

From the foregoing description, many modifications and other embodiments of the present invention would be obvious to a person having ordinary skill in the art. Therefore, the foregoing description should be interpreted only as an example and is provided for the purpose of teaching the best mode for carrying out the present invention to a person having ordinary skill in the art. Substantial changes in details of the structures and/or functions of the present invention are possible within the spirit of the present invention.

REFERENCE CHARACTERS LIST 1 relief valve
11 housing
12 plunger
12b valve portion
12c through passage
12d throttle (plunger throttle)
13 piston
15 spring member
16 damping chamber
18 differential pressure chamber
21a outlet port
23b inlet port
23d valve seat
24 valve passage
26 first pressure-receiving surface
27 second pressure-receiving surface
32 first damping passage
32a throttle
33 second damping passage
33a throttle
34 communication space

The invention claimed is:
1. A relief valve, comprising:
a housing including a valve passage having an inlet port through which an operating oil flows in and an outlet port through which the operating oil flows out;
a plunger housed in the housing in a manner to be movable to each of a closed position and an open position and pressed toward the open position by the operating oil in the inlet port, the closed position being a position in which a valve portion formed at one end of the plunger is seated on a valve seat of the housing to close the valve passage, the open position being a position in which the valve portion is off the valve seat to open the valve passage;
a differential pressure chamber into which the operating oil in the inlet port is guided via a through passage formed in the plunger and which presses an other end of the plunger toward the closed position by the operating oil guided;
a spring member that biases the plunger toward the closed position;
a piston exteriorly provided in a manner to be movable along the plunger and configured to compress the spring member by moving according to a pressure of the operating oil that is guided to the differential pressure chamber; and
a damping chamber formed around an outer peripheral surface of the piston and configured to store the operating oil to restrict movement of the piston in a compression direction, wherein:
the plunger includes a first damping passage penetrating the plunger and bringing an area outside the plunger and the through passage into communication;
the piston includes a second damping passage penetrating the piston and bringing an area inside the piston and the damping chamber into communication; and
a communication space connected to each of the first damping passage and the second damping passage is formed between the plunger and the piston.
2. The relief valve according to claim 1, wherein:
at least one of the first damping passage and the second damping passage includes a throttle that restricts a flow from the damping chamber to the through passage.
3. The relief valve according to claim 2, wherein:
each of the first damping passage and the second damping passage includes the throttle.
4. The relief valve according to claim 1, wherein:
the piston is movable from a non-compression position to a maximum compression position to compress the spring member; and
the communication space is in communication with the first damping passage and the second damping passage regardless of where the piston is located between the non-compression position and the maximum compression position.
5. The relief valve according to claim 1, wherein:
the plunger includes a spring bearing portion, a plunger throttle formed in the through passage, and a first pressure-receiving surface that receives a hydraulic pressure of the operating oil in the inlet port;
the spring member is a compression coil spring and is exteriorly provided on the plunger in a state of being compressed between the spring bearing portion of the plunger and the piston;
the piston includes a second pressure-receiving surface that receives a hydraulic pressure of the operating oil in the differential pressure chamber and, when the second pressure-receiving surface receives a pressure, moves in the compression direction toward the spring bearing portion of the plunger to compress the compression coil spring; and an area of the first pressure-receiving surface is smaller than an area of the second pressure-receiving surface.

* * * * *